United States Patent
Naumburger

(10) Patent No.: US 6,636,601 B1
(45) Date of Patent: Oct. 21, 2003

(54) METHOD FOR ADAPTING SUPPLEMENTARY EQUIPMENT TO AN ANALOG TELECOMMUNICATIONS TERMINAL AND DEVICE FOR THAT PURPOSE

(75) Inventor: Volkmar Naumburger, Erkner (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/358,313

(22) Filed: Jul. 21, 1999

(30) Foreign Application Priority Data

Jul. 21, 1998 (DE) .......................... 198 32 664

(51) Int. Cl.[7] .................... H04M 3/00; H04M 1/00
(52) U.S. Cl. .............. 379/357.01; 379/441; 379/442
(58) Field of Search ................... 379/93.01, 93.05, 379/93.09, 93.11, 100.01, 100.15, 357.01, 442, 441

(56) References Cited

U.S. PATENT DOCUMENTS 5,151,972 A * 9/1992 Lorenz et al.
5,812,646 A * 9/1998 Kikuchi
5,912,948 A * 6/1999 Nelson et al.

FOREIGN PATENT DOCUMENTS

| DE | 42 06 933 | 9/1993 |
| DE | 195 29 200 | 2/1997 |
| DE | 196 06 148 | 9/1997 |
| EP | 0 559 948 | 9/1993 |

* cited by examiner

*Primary Examiner*—Duc Nguyen
(74) *Attorney, Agent, or Firm*—Kenyon & Kenyon

(57) ABSTRACT

A method for adapting supplementary equipment, such as automatic answering equipments, intercommunication stations, automatic dialers and the like, to an analog telecommunications terminal as well as to a technical device for the implementation of the method. The supplementary equipment is inserted into the voice-communication path of the terminal in that the network access line of the terminal is accessed and in that the picked-off incoming voice signal is sent to the supplementary equipment and to a voice input/output unit electrically separate from the terminal equipment. Outgoing signals are generated by the supplementary equipment and/or by the voice input/output unit and are, in turn, fed into the network access line. Conversely, dialing and other control signals are transmitted directly between terminal equipment and telephone network via the network access line.

9 Claims, 4 Drawing Sheets

METHOD FOR ADAPTING SUPPLEMENTARY EQUIPMENT TO AN ANALOG TELECOMMUNICATIONS TERMINAL AND DEVICE FOR THAT PURPOSE

FIELD OF THE INVENTION

The present invention relates to a method for adapting supplementary equipment, such as automatic answering equipment, intercommunication stations, automatic dialers, and the like, to an analog telecommunications terminal, particularly to a telephone. The present invention further relates to a device for implementing the method.

BACKGROUND INFORMATION

Telecommunications terminals, in particular simple telephones, frequently need to be upgraded with supplementary equipment, such as automatic answering equipment, intercommunication stations, automatic dialers, etc. This necessitates creating a common connection for both devices while maintaining the functionality of the terminal device, particularly if supplementary equipment, such as an intercommunication station, is to be inserted into the voice-communication path of the terminal which is to be upgraded.

For this, it is known to directly influence the terminal device that is to be upgraded either by using existing modification add-ons of the terminal equipment or, if these are not available, by modifying the internal wiring of the terminal in appropriate fashion. The first approach presupposes that the terminal device to be upgraded has been made ready for modifications with regard to supplementary equipment. This is frequently not the case, particularly when working with simple analog telephones. The second approach presupposes that the user of the terminal either has sufficient technical knowledge to suitably modify the internal wiring of the terminal equipment, or that he or she is willing to engage the services of an expert.

SUMMARY OF THE INVENTION

An object of the present invention is, therefore, to delineate a method for adapting supplementary equipment to analog telecommunications terminals, in particular supplementary equipment that has an effect on the voice-communication path of the terminal device to be upgraded, which will obviate the need to intervene in the analog terminal device to be upgraded. It is a further object of the present invention to indicate a device which can be used universally to upgrade terminal equipment with supplementary equipment.

The object of the present invention is achieved by a method for adapting supplementary equipment to an analog telecommunications terminal. The object of the present invention is further achieved by a device for implementing this method.

To achieve the objective, the present invention proposes inserting a supplementary device into the voice-communication path of an analog terminal in such a manner that the operating functions required to set-up or tear-down a connection be able to be executed in the usual manner and that the electrical conditions relating to the telephone network remain unchanged.

For this purpose, the present invention proposes that the mechanical functions, such as entering dial commands on a keypad, be separated from the voice functions of the terminal device by connecting in parallel the analog terminal to be upgraded and the supplementary equipment in the network, without affecting the standardized line termination resistance.

More specifically, to decouple the original voice-communication path from the terminal device, the network access line of the terminal device is first accessed at high resistance, the standardized line termination resistance being maintained. The signal picked up is preferably proportional to the voice signal, which, coming from the telephone network, is transmitted to the terminal device. In- contrast to the normal mode of operation of the terminal equipment, the voice signal transmitted via the network access line directly to the terminal is, in the present invention, not utilized further to realize the voice function.

Rather, the original voice-communication path and the voice input/output unit of the terminal equipment, in particular the telephone handset, remain unused. The handset can be removed.

To realize a new voice-communication path in which the supplementary equipment is able to be easily inserted, the voice signal picked up at high resistance from the network access line, or a signal proportional thereto, is routed to the supplementary equipment and to a voice input/output unit that is electrically separate from the terminal device. Preferably, the voice signal that is picked up is amplified before being launched into the supplementary equipment or voice input/output unit, in order to bring it approximately to the signal level of the signal which was transmitted via the network access line.

Consequently, "incoming" voice signals, i.e. those transmitted via the telephone network to the terminal equipment, are routed to the supplementary equipment, as well as to a voice output unit, such as a loudspeaker. The user is able, as usual, to hear the voice signal which has been converted into a sound (audible) signal. In addition, the supplementary equipment can record the voice signals or otherwise influence them, e.g. reproduce them as audible signals via an intercommunication station.

The "outgoing" signals, i.e. the voice signals normally entered as sound signals by the user and converted into electronic signals for transmission via the telephone network, are, in the present invention, entered at a voice input unit, which is likewise electrically separate from the terminal to be upgraded. According to the present invention, the original voice-communication path of the terminal equipment also remains unused as far as inputting the voice signals is concerned. However, the terminal to be upgraded is also capable at any time of operating without the supplementary equipment, i.e. the original voice-communication path is not completely deactivated or interrupted. In addition to the voice input unit or alternatively thereto, the supplementary equipment generates an output signal which usually likewise corresponds to spoken speech, e.g. an announcement.

The output signal of the voice input unit and/or of the supplementary equipment is then launched at high resistance into the network access line of the terminal which is to be upgraded, while maintaining the line termination resistance. Preferably, a voltage—controlled power source is used for this purpose. The output signal of the voice input unit and/or the supplementary equipment is used to control the current flow of the power source, whose output is connected to the network access line.

In this manner, therefore, also outgoing signals—generated both directly by the user or voice input unit and by the supplementary equipment—are injected as voice signals into the network access line and transmitted via the telephone network.

The terminal equipment is still used to carry out the dialing and other control functionalities. The dialing and control signals are generated as usual by the terminal equipment via keypad input or the like and are routed directly via the network access line to the telephone network. Likewise, dialing and control signals generated by the exchange are sent directly via the network access line to the terminal equipment. This ensures that the user is able to continue to use the terminal equipment in the customary manner. There is no need to modify the terminal's control system.

In an advantageous further embodiment of the present invention, the functions of the supplementary equipment and/or the voice input/output unit are switched on and off independently of the terminal device's activity. For this purpose, the voltage level on the network access line is measured and the supplementary equipment and/or the voice input/output unit is activated or deactivated as a function thereof The measurement of the voltage level on the network access line is carried out, for example, by a comparator which accesses the network access line and delivers an output signal if the voltage level rises above or falls below a predetermined threshold. This switching signal is used to switch the supplementary equipment and/or voice input/output unit on and off.

A further refinement of the present invention also provides for drawing upon the activity recognition for economically switching-off the entire power supply.

DETAILED DESCRIPTION

Figure 1:
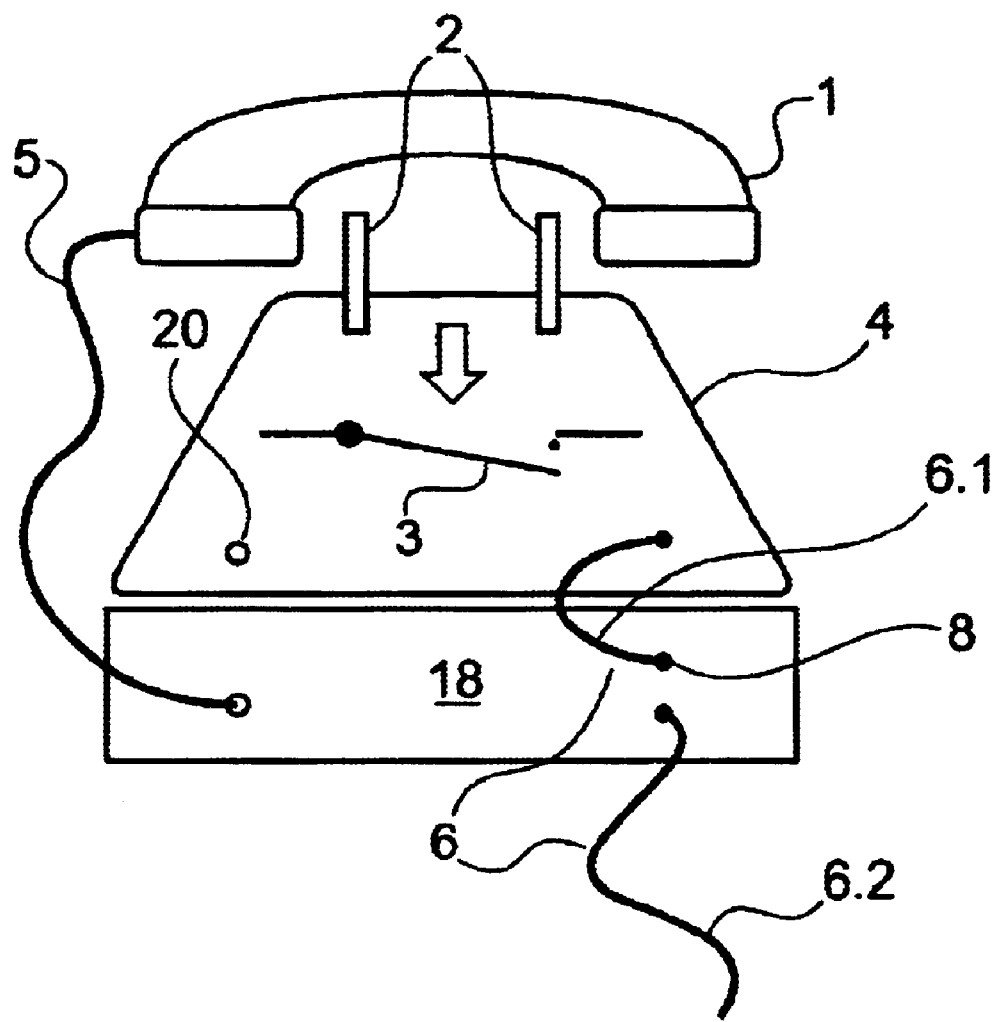
FIG. 1 shows a telecommunications terminal upgraded with a device for implementing a method according to the present invention.

FIG. 1 shows an analog telecommunications terminal in conjunction with a device 18 for adapting supplementary equipment. The supplementary equipment itself is, according to FIG. 2, integrated in device 18, and is not shown here.

Terminal device 4 has a handset rest 2, on which telephone handset 1, in the form of the voice input/output unit of terminal device 4, normally rests. Mechanically operating handset rest 2, in particular by putting down or lifting the handset, causes hybrid (switching) circuit 3 integrated in terminal device 4 to open/close. Hybrid circuit 3 makes it possible to establish the electrical connection to the telephone network via network access line 6, using components 6.1 and 6.2 shown in the diagram.

Normally, the dial commands entered at a dialing unit, e.g. a keypad, as well as the voice signals entered at the handset are transmitted in the form of electronic signals via network access line 6 to the telephone network and to the called party. For the transmission of voice signals, therefore, handset 1 of a standard terminal device is connected via a connection port 20 on the terminal device directly to the terminal and to the components contained therein, particularly a converter circuit 9 and network access line 6. Consequently, signals entered at the handset are sent directly to network access line 6.

According to the present invention, however, the terminal device is modified in this point: Handset I is not connected via connecting line 5 to connection port 20 on the terminal, but to an interface 19 on device 18 of the present invention. To achieve this, the handset originally present at terminal equipment 4 can be removed and be connected to device 18 at interface 19. Alternatively, it is possible not to use the handset on terminal equipment 4 and, instead, to place a voice input/output unit (connected from the outset to device 18) on handset rest 2 of terminal equipment 4 to be upgraded. It is essential that voice inputs are made at a handset unit 1, which is directly connected electronically to device 18. The voice input unit is, for example, the mouthpiece of a handset, together with the associated electronics or the microphone of a handsfree device. The voice output unit is the earpiece of a handset or the loudspeaker of a handsfree device.

In contrast to the mode of use of a conventional terminal device, the network connection of terminal 4 is, in the example shown here, not directly connected to the telephone network, but is first connected to device 18 in the form of network access line 6.1. The connection between terminal 4 and device 18 is established via a first interface 8, which is, for example, an analog a/b interface. The network access of terminal 4 to the telephone network is established via network access line 6.1 of the terminal and network access line 6.2 of device 18, in that first interface 8 is connected inside device 18 to network access line 6.2 (see FIG. 2). Consequently, entire network access line 6 is routed through device 18, the network access line being accessed, according to the present invention, inside the device.

To adapt supplementary equipment to an analog terminal 4, device 18 is connected to the telephone network by means of network access line 6.2. Device 18 is equipped with a handset unit 1 if such a unit is not already part of device 18. Handset unit 1, a telephone handset 1 in this case, is placed on handset rest 2 of the terminal the handset originally associated with the terminal being removed from the handset rest 2. The mechanical disconnection of the originally fitted handset is not necessary. In addition, network access line 6.1 of terminal 4 is connected to device 18 via first interface 8.

Figure 2:
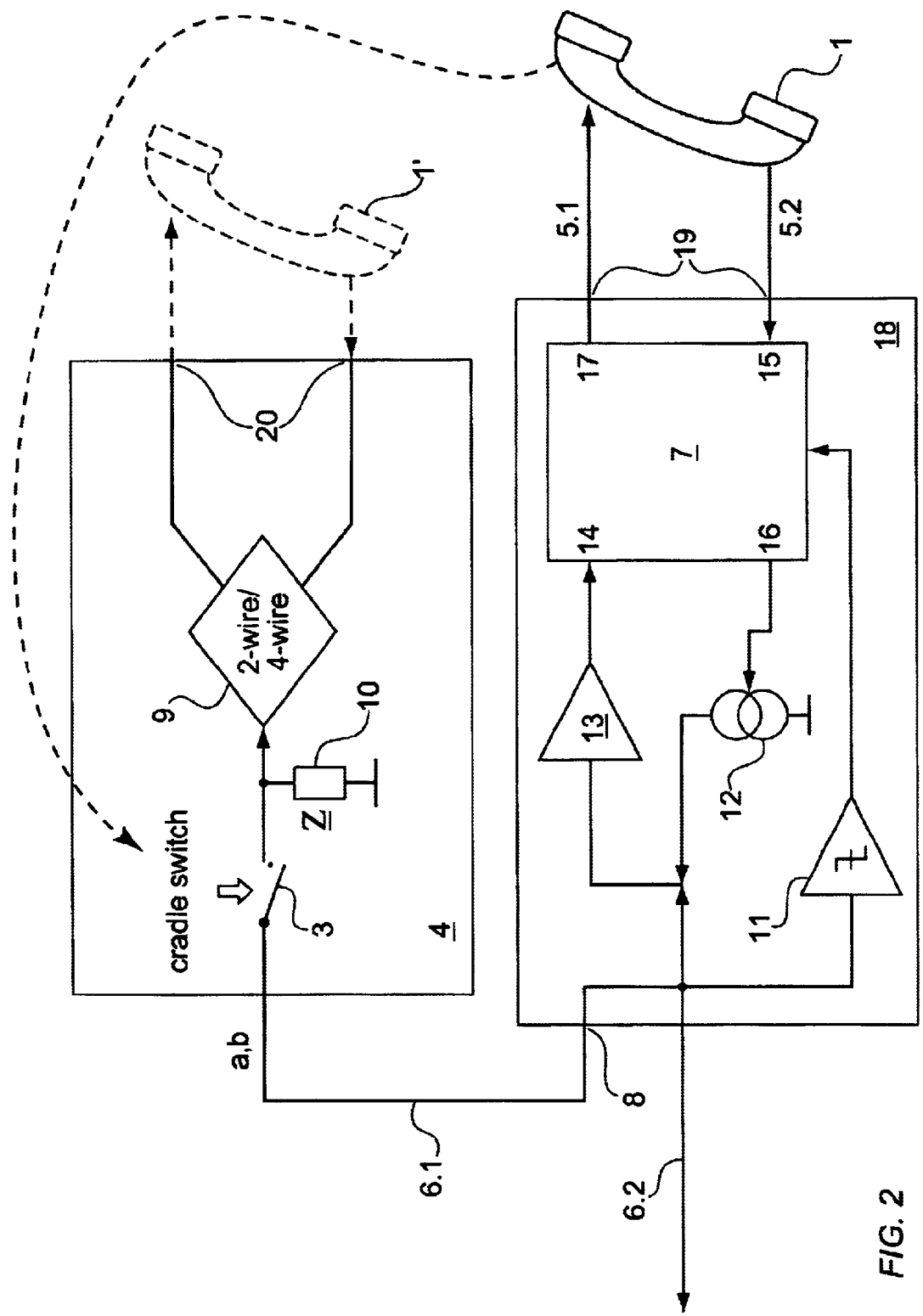
FIG. 2 shows a block diagram of a system including a terminal and a device according to the present invention.

The block diagram in FIG. 2 is used for a more accurate description of the operating principle of the present invention. The upper part of FIG. 2 shows the components of a standard terminal 4 which relate to the present invention. The lower part of FIG. 2 shows the basic construction of device 18 for the adaptation of supplementary equipment, supplementary equipment 7 being integrated in device 18.

The components of a standard telephone 4 relating to the present invention are handset 1, hybrid circuit 3, line termination resistance 10 and 2-wire/4-wire converter circuit 9.

Handset 1 connected to terminal 4 via a connection port 20 and a corresponding connecting line. According to the present invention, however, handset 1 of terminal 4 is not used; the original voice-communication path of terminal 4 remains unused. Instead of standard handset 1, handset I of device 18 rests on handset rest 2, as shown in FIG. 1.

Terminal 4 and device 18 are interconnected via network access line 6.1 of terminal 4. For this purpose, network access line 6.1, which is normally connected directly to a network access socket, is first connected via a first interface 8 to a network access line element 6.3 inside device 18, the network access line element 6.3 being brought out in the form of network access line 6.2 of device 18. Line element 6.2 forms the network access line of the technical device with which this device can be connected to a telephone network. In the application, three line elements 6.1, 6.3 and 6.2 form the network access line of terminal 4 through which signaling signals, such as dialing and other control signals, can be transmitted from the terminal via device 18 to the telephone network and vice versa.

Terminal 4 and device 18, therefore, are connected in two ways: First, there is an electrical connection in that the network access line of the terminal is routed through device 18, voice signals being coupled in and out inside device 18. Second, there is a connection between terminal and supplementary equipment in that handset 1 is electrically connected to device 18 via a connecting line 5 (5.1, 5.2) and is mechanically connected to terminal 4 by resting on the handset rest thereof. The mechanical connection, by which hybrid circuit 3 can be operated, is indicated in FIG. 2 by a dotted line from handset 1 to hybrid circuit 3.

Connection setup is started in the case of standard terminal equipment like terminal 4 in that handset 1 is picked up. This first of all causes the mechanical closing of cradle contact (hybrid circuit) 3 via handset rest 2, which at the same time establishes an electrical connection to an exchange or private automatic branch exchange via network access line 6. Via the network access line the telephone is also supplied with the electrical energy required for the operation of the telephone itself.

As a result of the electrical loading (direct current), the no-load voltage on network access line 6 drops to a significantly lower value. The no-load voltage is usually approx. 24 to 70 V. With the hybrid circuit closed, i.e. with terminal 4 activated, the voltage is around 8 to 12 V.

At a dialing unit, e.g. a keypad, the user of terminal 4 enters dialing commands which are converted into electrical signals that are transmitted via network access line 6.

After the connection has been successfully established, the voice-communication paths enter into operation. First, the network access line at the terminal end must be terminated with a standardized line resistance 10 (alternating current). In a standard terminal, this is already carried out when cradle contact (hybrid circuit) 3 is closed. The incoming voice signal transmitted via network access line 6 (6.2, 6.3, 6.1) is routed by means of converter circuit 9 to the loudspeaker of handset 1' and the voice signal entered at the microphone of handset 1 is launched into the network access line by means of converter circuit 9. This standard voice-communication path with handset 1 functioning as interface to the user remains unused in the present invention, although it is still basically capable of operation. Instead, voice signals which come from the telephone network and are transmitted via network access line 6.2 to device 18 and then via line elements 6.3 and 6.1 to the terminal are picked off inside device 18. They are forwarded to supplementary equipment 7 as well as to the loudspeaker of voice input/output unit 1, which is connected to device 18. Conversely, sound signals entered at voice input/output unit 1 are converted into electrical voice signals, transmitted via line 5.2 to device 18 and to supplementary equipment 7 and are fed into network access line 6 inside the device. In this manner, the voice-communication path of the terminal is routed via device 18, a supplementary equipment 7 being integrated into the voice-communication path (see FIG. 3). The other functions of analog terminal 4, in particular the control by keypad inputs and the like, are not affected by the decoupling of the voice-communication path by means of device 18, because these signaling signals are still transmitted via network access line 6, consisting of elements 6.1, 6.3 and 6.2.

In order to keep the electrical conditions in the telephone network constant, it Is necessary that line termination resistance IO is not falsified by the additional circuitry. The line termination resistance of the overall technical device must not, therefore, differ substantially from the value of line termination resistance 10. For this reason, the incoming signal is picked off from network access line 6 via a high resistance amplifier 13. In the ideal case, the input resistance of the amplifier is infinite, in practice, it should be greater than 600 ohms.

The output signal of amplifier 13 is supplied to a first input 14 of supplementary equipment 7. Likewise, the outgoing signal available at first output 16 of supplementary equipment 7 must be supplied at high resistance to network access line 6. According to the present invention, this is accomplished by a voltage-controlled power source 12. The output signal of the power source is controlled by the signal at output 16 of the supplementary equipment and is fed into the network access line. The operation of converter circuit 9 of the terminal equipment is now performed by elements 12 and 13.

First, the signal is further processed by supplementary equipment 7, e.g. it is stored or amplified. Second, the signal is sent via a second output 17 of supplementary equipment 7 and connecting line 5.1 to the loudspeaker of voice input/output unit 1. The outgoing voice signal generated by the user is supplied to supplementary equipment 7 via a second input 15 connected via a line 5.2 to the microphone of the voice input/output unit and can be launched via the output 16 into the network access line. Likewise, the signal generated by supplementary equipment 7, e.g. an announcement of an automatic answering equipment, can be output via output 16 and also launched into network access line 6.

Figure 3:
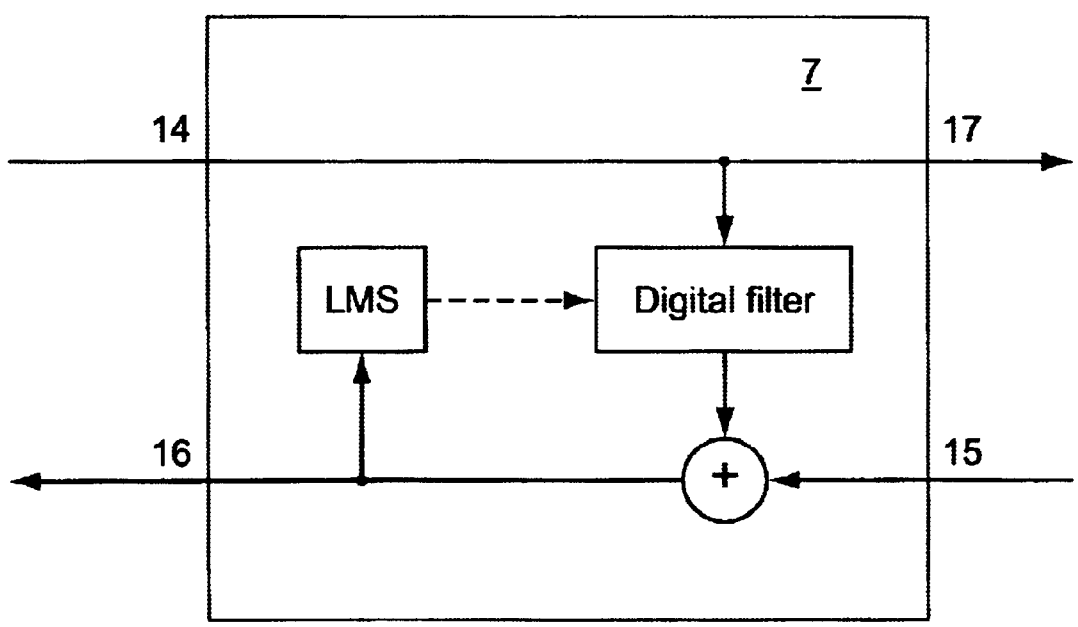
FIG. 3 shows the basic routing of signals within the supplementary equipment.

The signal paths inside supplementary equipment 7 are shown in detail in FIG. 3. The signal generated by supplementary equipment 7 or by its digital filter is combined with the signal of the voice input/output unit. If the supplementary equipment is an intercommunication station, room echo suppression may be additionally provided, indicated here by element LMS.

Consequently, the additional functions of the supplementary equipment can be realized while the voice function and operation functions of the overall arrangement are guaranteed. The voice-communication paths of voice input/output unit I and of supplementary equipment 7 are connected in parallel.

In order to prevent signals being supplied from or into the network when there is no connection set up, an advantageous further development of the present invention provides for activity recognition, which causes supplementary equipment 7 to be switched on or off. Activity on network access line 6 is recognized by measuring the DC voltage on access line 6 by means of a comparator 11. Comparator 11 accesses network access line 6 and delivers an output signal if the voltage level rises above or falls below a predetermined threshold. The threshold value is selected such that it lies between the no-load voltage and the voltage under load, with the result that a change between both states can be reliably recognized. Comparator 11 delivers an output signal which indicates the operating state of terminal 4, i.e., essentially whether hybrid circuit 3 is open or closed. The output signal of comparator 11 is used to control the operating state of supplementary equipment 7 and/or of voice input/output unit 1, preferably both.

Figure 4:
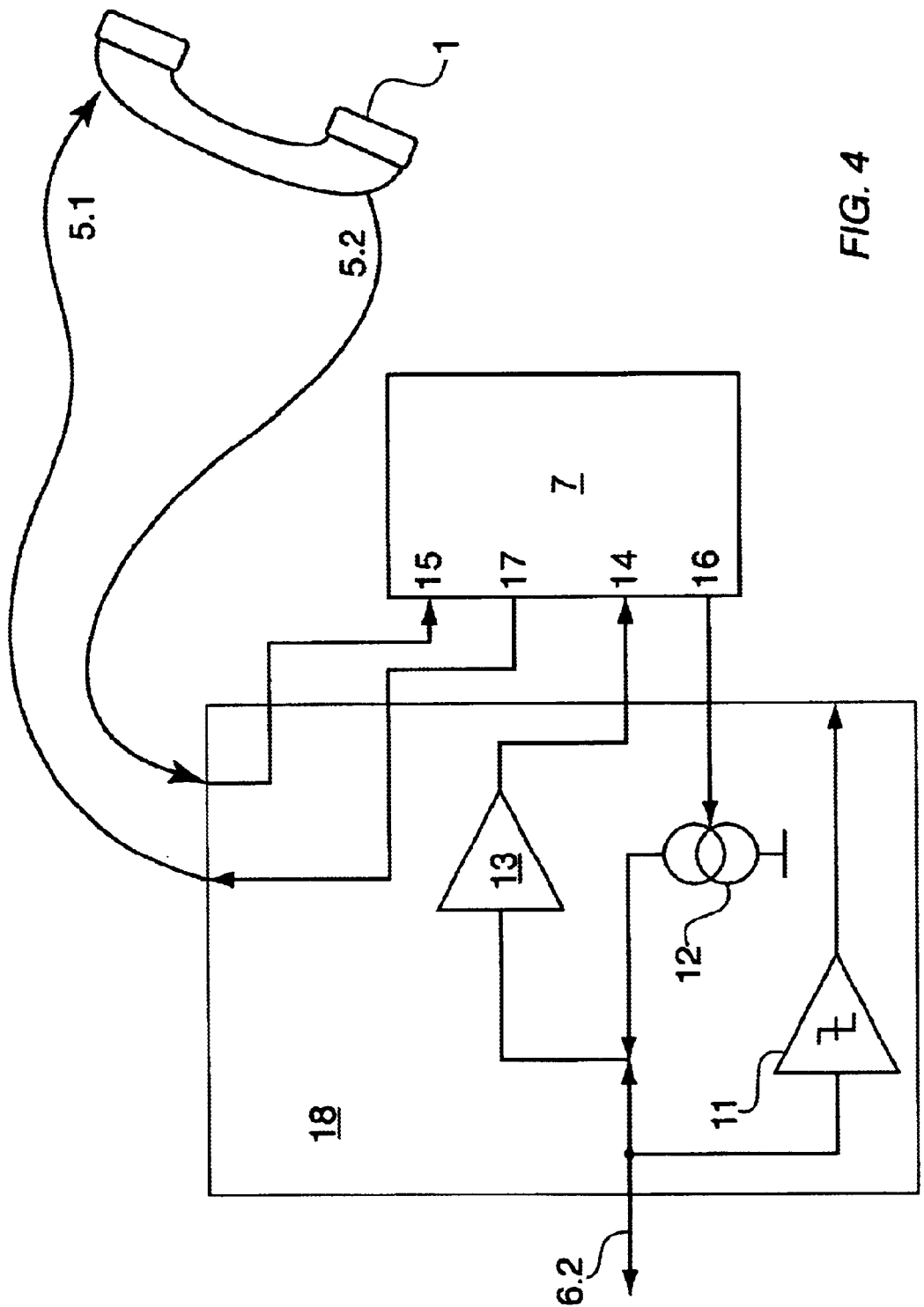
FIG. 4 shows a device according to the present invention, which is used as an adapter for the connection of supplementary equipment.

FIG. 4 shows, as a further dimension, a technical device 18 according to the present invention, the device 18 serving as an adapter for the connection of supplementary equipment 7, but not itself containing supplementary equipment 7. The components of the adapter and of the supplementary equipment are identical to those shown in FIG. 2 and are provided with the same reference numbers. With adapter 18 it is possible to connect any commercially available supplementary equipment 7 to a simple terminal without there being any need for modification in respect of the electronics of the supplementary equipment or terminal equipment.

The present invention can be used to advantage in the field of telecommunications particularly as a modified supplementary device or as an adapter for the connection of a supplementary device that is universally applicable to upgrade existing terminal equipment, as a result of which the use of new telecommunications services is made available to a large number of customers.

What is claimed is:

1. A method for adapting a supplementary equipment to an analog telecommunications terminal equipment, the supplementary equipment including at least one of an automatic answering equipment, an intercommunication station, and an automatic dialer, and the analog telecommunications terminal equipment including a hybrid circuit arranged with respect to a network access line for connection to a telephone network and through which voice signals and signaling signals are capable of being transmitted, comprising the steps of:

providing a high-resistance access to the network access line while maintaining a line termination resistance for detecting the voice signals transmitted to the analog telecommunications terminal equipment;

supplying one of a picked-off speech signal and a speech signal proportional to the picked-off speech signal to the supplementary equipment and to a voice input/output unit that is electrically separate from the analog telecommunications terminal equipment;

causing at least one of the supplementary equipment and the voice input/output unit to generate an output signal;

providing a high-resistance feeding of the output signal into the network access line while maintaining the line termination resistance; and causing a direct transmission of the signaling signals between the analog telecommunications terminal equipment and the telephone network via the network access line.

2. The method according to claim 1, further comprising the step of:

adapting at least one of an operating state of the supplementary equipment and an operating state of the voice input/output unit to an operating state of the analog telecommunications terminal equipment by performing the steps of:

measuring a voltage level on the network access line, and performing one of an activation and a deactivation of at least one of the supplementary equipment and the voice input/output unit as a function of the voltage level.

3. The method according to claim 2, further comprising the step of:

activating at least one of the supplementary equipment and the voice input/output unit if the voltage level on the network access line is one of above and below a predetermined threshold.

4. The method according to claim 1, further comprising the steps of:

amplifying the picked-off speech signal; and after the picked-off speech signal is amplified, launching the picked-off speech signal into one of the supplementary equipment and the voice input/output unit.

5. The method according to claim 1, further comprising the steps of:

routing the picked-off speech signal to a first input channel of the supplementary equipment;

routing the picked-off speech signal via a first output channel of the supplementary equipment to an input of the voice input/output unit;

routing the output signal of the voice input/output unit to a second input channel of the supplementary equipment; and launching the output signal of the voice input/output unit via a second output channel of the supplementary equipment into the network access line.

6. A device for adapting a supplementary equipment to an analog telecommunications terminal equipment, comprising:

a network access line through which a connection to a telephone network is established;

a first interface for establishing a connection with the analog telecommunications terminal equipment, wherein the network access line is internally connected to the first interface;

an apparatus including at least one of a voice input/output unit and a second interface, wherein a connection with the voice input/output unit is established through the second interface, wherein the voice input/output unit activates a hybrid circuit of the analog telecommunications terminal equipment according to one of a mechanical activation and an electrical activation;

a third interface for establishing one of a connection and an integration with the supplementary equipment; and a high-resistance amplifier for accessing the network access line, the high-resistance amplifier producing an output signal that is routed to a first input of the supplementary equipment and to an input of the voice input/output unit, wherein an output signal of the voice input/output unit is routed to a second input channel of the supplementary equipment and is fed at a high resistance into the network access line.

7. The device according to claim 6, further comprising:

a comparator for accessing the network access line and delivering a switching signal dependent on a voltage level, the switching signal being capable of performing one of an activation and a deactivation of the supplementary equipment.

8. The device according to claim 6, wherein the voice input/output unit includes at least one of a handset and an intercommunication station.

9. The device according to claim 6, further comprising:

a voltage-controlled power source for performing at least one of a high-resistance feeding of an output signal of the supplementary equipment and the high-resistance feeding of the output signal of the voice input/output unit into the network access line.

* * * * *